(12) United States Patent
Farley et al.

(10) Patent No.: US 6,816,732 B1
(45) Date of Patent: Nov. 9, 2004

(54) OPTIMAL LOAD-BASED WIRELESS SESSION CONTEXT TRANSFER

(75) Inventors: Kevin L. Farley, Melbourne Beach, FL (US); Carlo Amalfitano, Melbourne Beach, FL (US)

(73) Assignee: IPR Licensing, Inc., Wilmington, DE (US)

( * ) Notice: Subject to any disclaimer, the term of this patent is extended or adjusted under 35 U.S.C. 154(b) by 484 days.

(21) Appl. No.: 09/626,784

(22) Filed: Jul. 27, 2000

(51) Int. Cl.⁷ .............................................. H04Q 7/20
(52) U.S. Cl. ..................... 455/453; 455/434; 370/328
(58) Field of Search ................................ 455/436, 438, 455/450, 453, 62, 434; 370/328

(56) References Cited

U.S. PATENT DOCUMENTS

| | | | |
|---|---|---|---|
| 4,670,899 A * | 6/1987 | Brody et al. ................. | 455/453 |
| 5,212,806 A * | 5/1993 | Natarajan .................... | 455/525 |
| 5,325,419 A | 6/1994 | Connolly et al. ............. | 379/60 |
| 5,345,467 A | 9/1994 | Lomp et al. .................... | 375/1 |
| 5,754,959 A * | 5/1998 | Ueno et al. .................. | 455/453 |
| 5,799,010 A | 8/1998 | Lomp et al. ................. | 370/335 |
| 5,862,155 A | 1/1999 | Lomp et al. ............... | 371/43.4 |
| 5,881,094 A | 3/1999 | Schilling .................... | 375/202 |
| 5,926,465 A | 7/1999 | Schilling .................... | 370/261 |
| 5,926,535 A * | 7/1999 | Reynolds ............... | 379/221.06 |
| 5,930,297 A | 7/1999 | Kaewell, Jr. et al. ....... | 375/260 |
| 5,940,382 A | 8/1999 | Haim ........................ | 370/335 |
| 5,960,347 A | 9/1999 | Ozluturk ..................... | 455/442 |
| 5,974,039 A | 10/1999 | Schilling .................... | 370/335 |
| 6,011,789 A | 1/2000 | Schilling .................... | 370/342 |
| 6,018,664 A * | 1/2000 | Skarin ........................ | 455/453 |
| 6,169,880 B1 * | 1/2001 | La Fratta et al. .......... | 455/11.1 |
| 6,212,385 B1 * | 4/2001 | Thomas et al. ............. | 455/447 |
| 6,215,776 B1 * | 4/2001 | Chao ........................... | 370/316 |
| 6,266,532 B1 * | 7/2001 | Austin ........................ | 455/453 |
| 6,317,600 B1 * | 11/2001 | Salonaho et al. ........... | 455/453 |
| 6,363,252 B1 * | 3/2002 | Hamalainen et al. ....... | 455/436 |
| 6,381,458 B1 * | 4/2002 | Frodigh et al. ............. | 455/442 |
| 6,553,233 B1 | 4/2003 | Lee et al. | |
| 6,609,007 B1 | 8/2003 | Eibling et al. | |
| 6,611,506 B1 | 8/2003 | Huang et al. | |
| 2002/0042272 A1 * | 4/2002 | Wedi et al. .................. | 455/442 |
| 2003/0003921 A1 * | 1/2003 | Laakso ....................... | 455/453 |

* cited by examiner

*Primary Examiner*—Nay Maung
*Assistant Examiner*—Tan Trinh
(74) *Attorney, Agent, or Firm*—Hamilton, Brook, Smith & Reynolds, P.C.

(57) ABSTRACT

In a wireless communication network, a system and method for transferring a wireless session context allows a subscriber access unit to transfer the session context from one base station to another base station depending on a loading factor which indicates the throughput load through each of the base stations. A subscriber access unit which is located in an overlapping wireless coverage area served by both base stations can transfer the session context such that it is served by the base station having the least throughput load. Subscriber access units in overlapping coverage areas will therefore tend to transfer session context to the least burdened base station processor. In this manner, performance is improved because subscriber access units within a wireless coverage area of multiple base station processors are transferred to the base station able to provide the maximum throughput. Further, subscriber access units may be mobile, traveling between coverage areas and passing through overlapping coverage areas. A check is made to determine which of the base station processors corresponding to the coverage areas is least burdened by throughput. A loading factor indicative of resource utilization of each of the base station processors is computed. Each of the loading factors is compared, and the session context is transferred, or switched to the base station having the lowest loading factor.

19 Claims, 6 Drawing Sheets

OPTIMAL LOAD-BASED WIRELESS SESSION CONTEXT TRANSFER

BACKGROUND OF THE INVENTION

In a wireless telecommunications network, subscriber access units provide a wireless communication link between user PCs and a base station processor connected to a public access network. Each of the base station processors serves a wireless coverage area, or sector, defined by the physical transmission capacity of the base station processor which serves the sector. In order to provide uninterrupted service to a mobile subscriber access unit, the sectors typically have overlapping portions. As a result of the overlapping portions, a subscriber access unit may concurrently be within multiple sectors each served by a base station processor.

A subscriber access unit maintains a wireless communication link to the base station processor via a wireless session context. The session context corresponds to a plurality of connections used to provide message traffic to and from the user PCs. When a subscriber access unit is within multiple sectors, it may establish a wireless session context via the base station processor serving any of the multiple sectors. In this manner, a subscriber access unit may be served from any of the candidate base station processors which serve the multiple sectors.

Each base station processor typically serves many subscriber access units. The number of subscriber access units served by a base station processor affects the throughput of each subscriber access unit in wireless communication with the base station processor. A loading factor is indicative of a traffic load on a base station processor, and therefore corresponds to the throughput which can be provided to each processor, and therefore corresponds to the throughput which can be provided to each subscriber access unit. A high loading factor is indicative of a base station processor burdened with message traffic for many subscriber access units. Conversely, a low loading factor is indicative of an unburdened base station processor.

In a base station processor, it is computationally expensive to determine if a subscriber access unit is located in a portion of a sector which overlaps with another sector. It is further computationally expensive to determine if the loading factor corresponding to the base station processor serving the overlapping sector is less than that of the base station processor currently serving the subscriber access unit. Such determinations utilize resources that could otherwise be used for traffic through the base station processor. Accordingly, it would be beneficial to provide a subscriber access unit with the ability to determine the loading factor of each of the candidate base station processors corresponding to the overlapping sectors, and to allow the subscriber access unit to effect a session context transfer, or handoff, to the base station processor with a lower loading factor.

SUMMARY OF THE INVENTION

A system and method for transferring a wireless session context in a wireless communication network allows a subscriber access unit to transfer the session context from a first base station to a second base station depending on a loading factor which indicates the throughput load through each of the first and second base stations. A subscriber access unit which is located in an overlapping wireless coverage area of both the first base station and the second base station can transfer the session context such that it is in wireless communication with the base station having the least throughput load. Subscriber access units in overlapping coverage areas will therefore tend to transfer session context to the least burdened base station processor. In this manner, performance is improved because subscriber access units within a wireless coverage area of multiple base station processors are transferred to the base station able to provide the maximum throughput.

The wireless communication network includes a plurality of base station processors with overlapping coverage areas. Subscriber access units may be located in an overlapping coverage area served by a plurality of base station processors. Further, subscriber access units may be mobile, traveling between coverage areas and passing through overlapping coverage areas. When it is determined that a subscriber access unit is in a coverage area of more than one base station, a check is made to determine which of the base station processors corresponding to the coverage areas is least burdened by throughput. A loading factor indicative of resource utilization of each of the base station processors is computed. Each of the loading factors is compared, and the session context is transferred, or switched, to the base station having the lowest loading factor. Alternatively, the session context remains with the base station processor currently serving the subscriber access unit, if the current base station processor has the lowest loading factor. The loading factor may be computed from a variety of load parameters, and may be determined by the base station or by the subscriber access units. The loading factor may be computed at a variety of intervals, such as being initiated at uniform predetermined intervals, as a result of a loading summary sent by a base station processor, by events such as a subscriber access unit entering a new wireless coverage area, or by a loading factor approaching a predetermined threshold.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
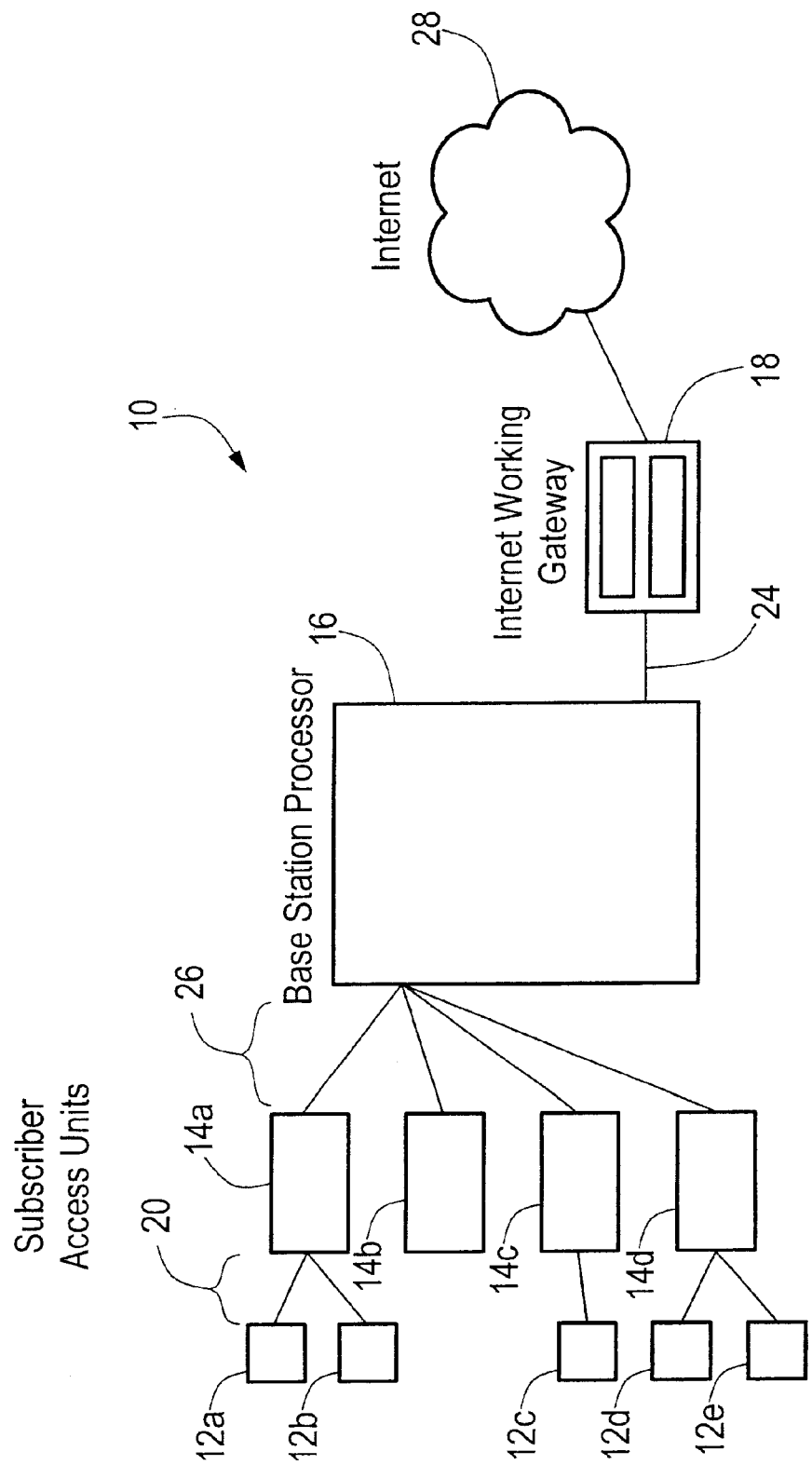
FIG. 1 shows a wireless communication network suitable for performing a wireless session context transfer as defined herein.

FIG. 1 shows a block diagram of a communication system 10 operable for providing a wireless communication link in a wireless network as defined herein. Referring to FIG. 1, the communication system includes local computing devices, generally user PCs 12a–12e, subscriber access units 14a–14d, a base station processor 16, and an internetworking gateway 18. The user PCs 12 generally are in communication with the subscriber access units 14 generally via a wired connection 20. The subscriber access units 14 are in communication with a base station processor 16 via a wireless connection 26. The base station processor is in communication with an internetworking gateway 18 via a wired connection 24. The internetworking gateway 18 is adapted for communication via a public access network such as the Internet 28.

The user PCs 12 may therefore be provided access to the internetworking gateway 18, which may be any remote entity located on the Internet or other network, through a combination of the wired 20, 24 and wireless connections 26 provided. The wired connection 20, 24 is typically supported by a protocol such as TCP/IP or UDP. The wireless connection is supported by a wireless link protocol such as IS_95 or another wireless link protocol such as the protocol described in pending U.S. Patent Application entitled "Dynamic Frame Size Settings for Multichannel Transmission," published as PCT Application No. WO 99/44341, Sep. 2, 1999.

Typically, the PC 12 provides a data packet, such as an Internet Protocol (IP) packet, to the subscriber access unit 14 over the wired connection 20, which may, for example, be an Ethernet type connection. The subscriber access unit 14 removes the framing of the data packet and transfers the data in the data packet to the base station processor 16 over the wireless connection 26 in accordance with the wireless link protocol. The base station processor 16 extracts the wireless connection frames and forwards them, in IP packet form, over the wired connection 24 to the internetworking gateway 18.

Similarly, packets sent from the Internet are sent to the base station processor 16 over the wired link 24, transmitted to the corresponding subscriber access unit 14 over the wireless link 26, and sent to the user PC 12 over the wired link 20. The subscriber access unit 14 and the base station processor 16 therefore denote endpoints of the wireless connection 26, providing a wireless link from the user PC 12 to the public access network such as the Internet 28.

Figure 2A:
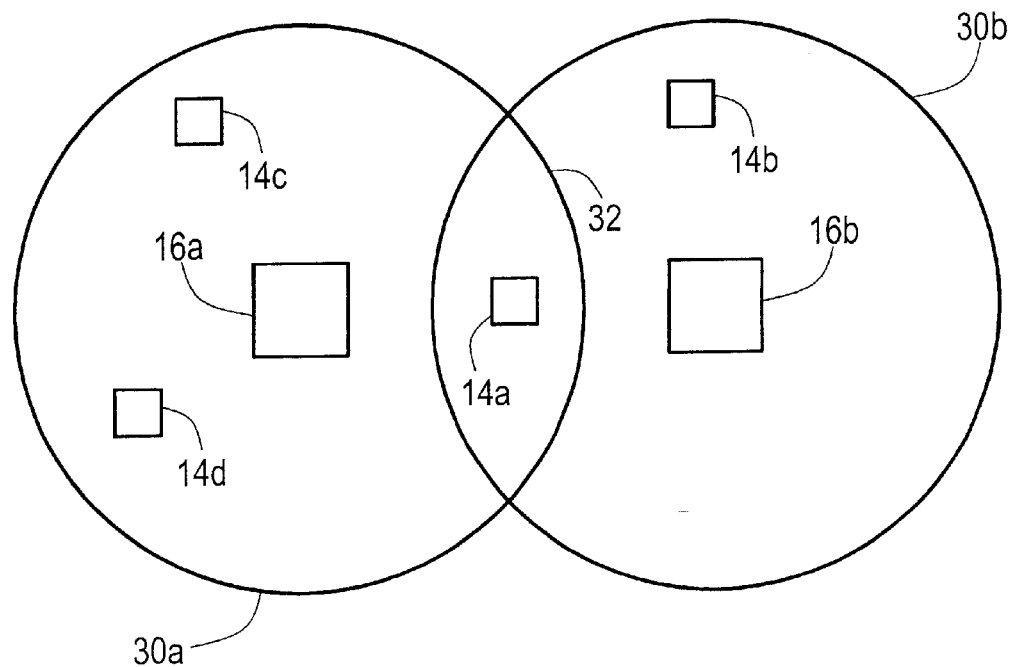
FIG. 2a shows a subscriber access unit in an overlapping sector portion.

FIG. 2a shows a subscriber access unit 14a in an overlapping sector portion 32. In that figure, the subscriber access unit 14a is in an overlapping sector portion 32 defined by area common to wireless coverage areas 30a and 30b. Subscriber access units 14a, 14c, and 14d are in sector 30a, and may be served by a first base station processor 16a. Subscriber access units 14a and 14b are in sector 30b, and may be served by a second base station processor 16b. Accordingly, the subscriber access unit 14a can establish a wireless session context with either base station processor 16a or 16b.

According to the invention defined by the present claims, the subscriber access unit 14a determines a loading factor for each base station processor 16a, 16b corresponding to the sectors it occupies. After determining the loading factor, described further below, a load divergence is computed based on the difference between the loading factors of the candidate base station processors 16a, 16b by which the subscriber access unit may be served. At a given time, the subscriber access unit is being served by a particular one of the base station processors 16a and a6b. If the load divergence indicates that another base station processor 16 generally, is less burdened, then the subscriber access unit 14a will perform a session context transfer to the less burdened base station processor. The subscriber access unit 14a will then be served by the less burdened base station processor. Note that two sectors 30a and 30b are shown for illustrative purposes only. In other environments, a subscriber access unit 14 may be located in an overlapping portion of many sectors, and therefore able to select from among multiple base station processors.

Figure 2B:
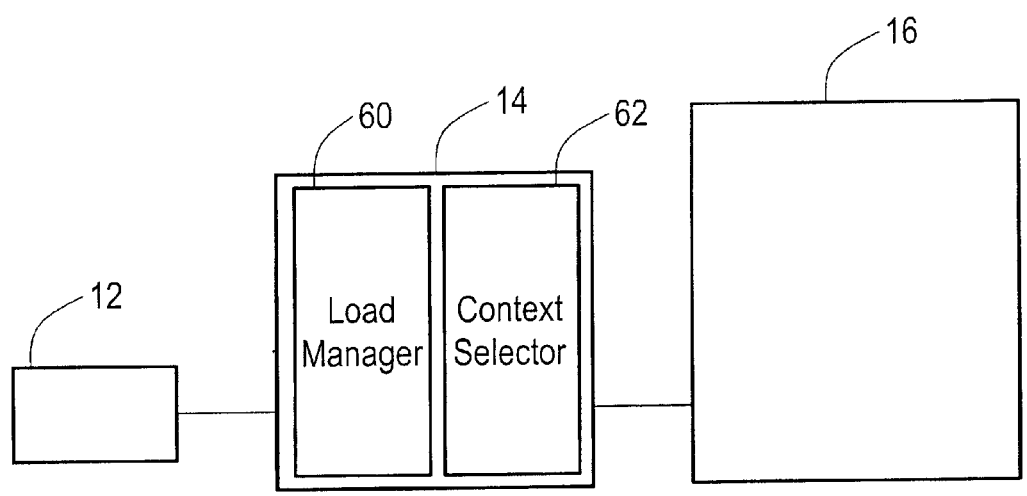
FIG. 2b shows a subscriber access unit in greater detail.

FIG. 2b shows a subscriber access unit 14 including a load manager 60 and the context selector 62. The load manager is operable to receive load parameters and compute the loading factors and the load divergence of a base station processor 16, as will be described further below. The context selector 62 is operable to transmit messages to a base station processor 16 to transfer the session context to another base station 16.

Figure 3:
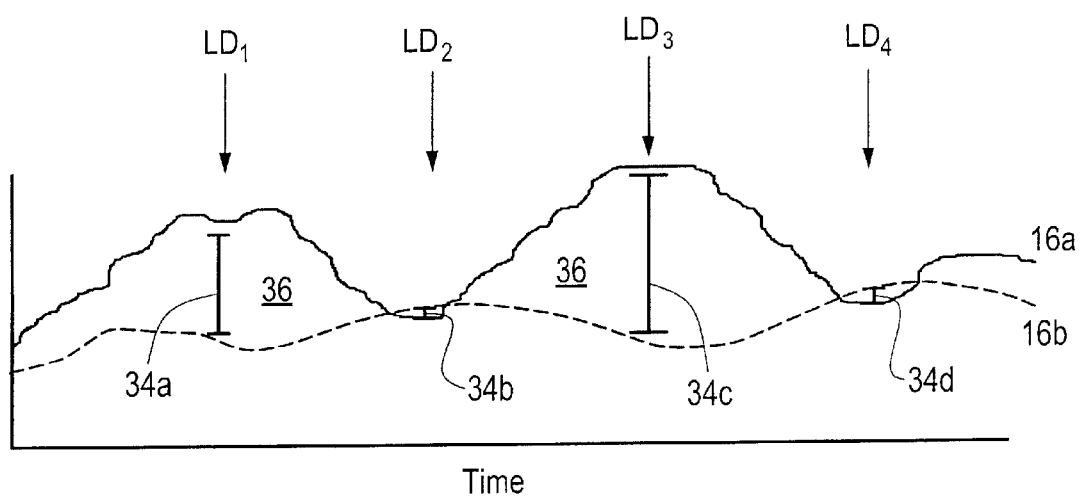
FIG. 3 shows a graph depicting the loading factor of multiple base station processors.

FIG. 3 shows a graph of loading factors over time. The loading factors corresponding to base station processors 16a and 16b is shown. At the times depicted by $LD_1$ and $LD_3$, it can be seen that the load divergence 34a and 34c is large. At these times the subscriber 14 may consider a session context transfer from base station processor 16a to base station processor 16b, since base station 16b is much less burdened. At times $LD_2$ and $LD_4$, base station processor 16b is more heavily burdened, however the load divergence values 34b and 34d are much less than the load divergence values 34a and 34c. Accordingly, it may not be worth the overhead required to make a session context transfer from base station processor 16b to 16a. A context transfer threshold is therefore established to indicate a predetermined load divergence which would cause a session context transfer to be established.

Further, while base station processor 16b is occasionally is more burdened than the base station processor 16a at times $LD_2$ and $LD_4$, base station 16a is generally more burdened, as shown by the area 36 under the graph and particularly at times $LD_1$ and $LD_2$. Accordingly, the subscriber 14 keeps a history of previous loading factors so that it does not perform a context transfer at times $LD_2$ and $LD_4$ because the loading factor history indicates that base station processor 16a will only be less burdened than the base station processor 6b for a short time.

In another particular embodiment, the comparison of loading factors is a two stage process. In this process, snapshot loading factor is determined for each candidate base station processor. The snapshot loading factor indicates the current loading factor at the time the snapshot loading factor is determined. The loading factor history is not considered. An immediate loading factor difference is then computed based on the difference between the snapshot loading factors. If the loading factor difference is greater than a loading factor threshold, then a weighted loading factor is determined. The loading factor threshold is a minimum value which suggests that a session context transfer is likely to be beneficial.

The weighted loading factor considers not only the current loading factor, but also the loading factor history over a previous period. Since determination of the snapshot loading factor requires fewer resources, repetitive computation of the weighted loading factor is avoided at times when it is unlikely to provide an indication of a beneficial context transfer. If the loading factor threshold is exceeded, then the weighted loading factor is determined for each candidate base station processor. The load divergence is computed using the weighted loading factor to determine if another base station processor also capable of serving the subscriber access unit is less burdened, based on the resource utilization of each base station processor, described further below.

Figure 4:
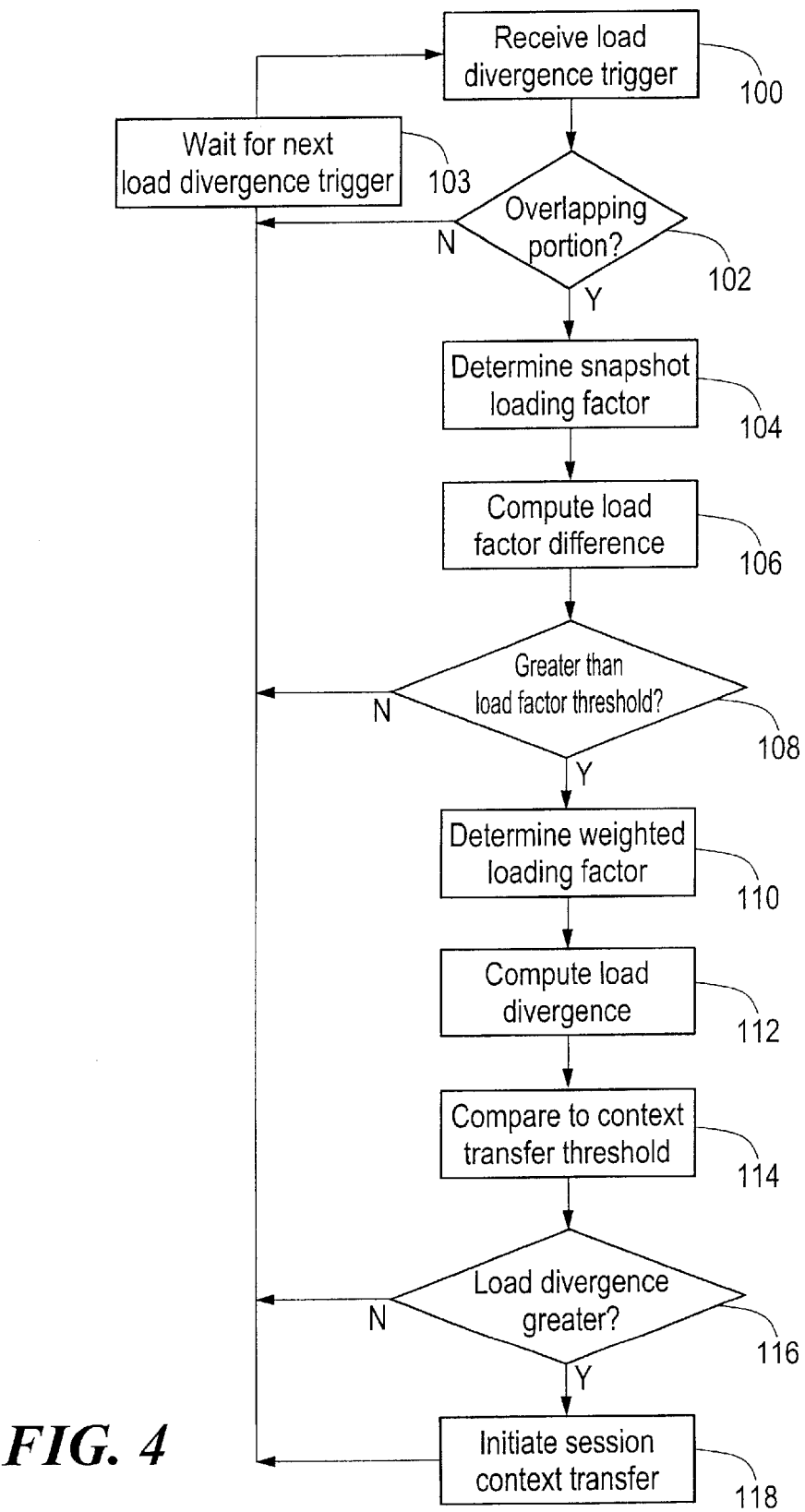
FIG. 4 shows a flowchart for transferring a wireless session context.

FIG. 4 shows a flowchart of a session context transfer. Referring to FIG. 4, a subscriber access unit receives a load divergence trigger, as depicted at step 100. The load divergence trigger indicates that a determination is to be made as to whether a session context transfer should be performed. The load divergence trigger may be a loading summary message from a base station processor, a notification that the subscriber access unit has entered another sector, an expiration of a uniform predetermined interval, or other indication.

A check is made to determine if the subscriber access unit is in an overlapping portion of a sector, and therefore able to be served by more than one base station processor, as depicted at step 102. If it is not, control reverts to step 100 until the next load divergence trigger, as shown at step 103. If there are multiple base station processors which can serve the subscriber access unit, then a snapshot loading factor is determined for each candidate base station processor, as shown at step 104. The snapshot loading factor is indicative of only the current level of resource utilization at the base station processors, and does not consider the loading factor history.

The load manager then computes a loading factor difference, based on the current loading factors, as disclosed at step 106. A check is made to determine if the loading factor difference is greater than the loading factor threshold, as shown at step 108. The loading factor threshold is used to avoid frequent computation of a weighted loading factor when the load divergence is not likely to indicate a context transfer. For example, if two base station processors are near equally loaded, the loading factor history may indicate that the base station processors frequently alternate with respect to which has a higher loading factor. Since the two base station processors are near equally loaded, a session context transfer is unlikely to provide a subscriber access unit with increased throughput. Accordingly, the loading factor threshold provides a minimum loading factor quantum, indicative of a likelihood of increased throughput, before a session context transfer is considered.

If the loading factor difference exceeds the loading factor threshold, then the load divergence is computed by the load manager. For each base station, the weighted loading factor is determined including the loading factor history, as depicted at step 110. The load divergence is computed to determine if a session context transfer would be beneficial, as shown at step 112. The load manager compares the load divergence to a context transfer threshold, as disclosed at step 114. A check is performed to determine if the load divergence is greater than the context transfer threshold, as depicted at step 116.

If the load divergence is greater, then a session context transfer is initiated by a context selector to establish a session context with the base station processor having the lowest loading factor, as depicted at step 118, and control reverts to step 100 to wait for the next load divergence trigger, as shown at step 103. If the load divergence does not exceed the context transfer threshold, then the current base station processor continues to serve the subscriber access unit and control reverts to step 100 to wait for the next load divergence trigger.

Figure 5:
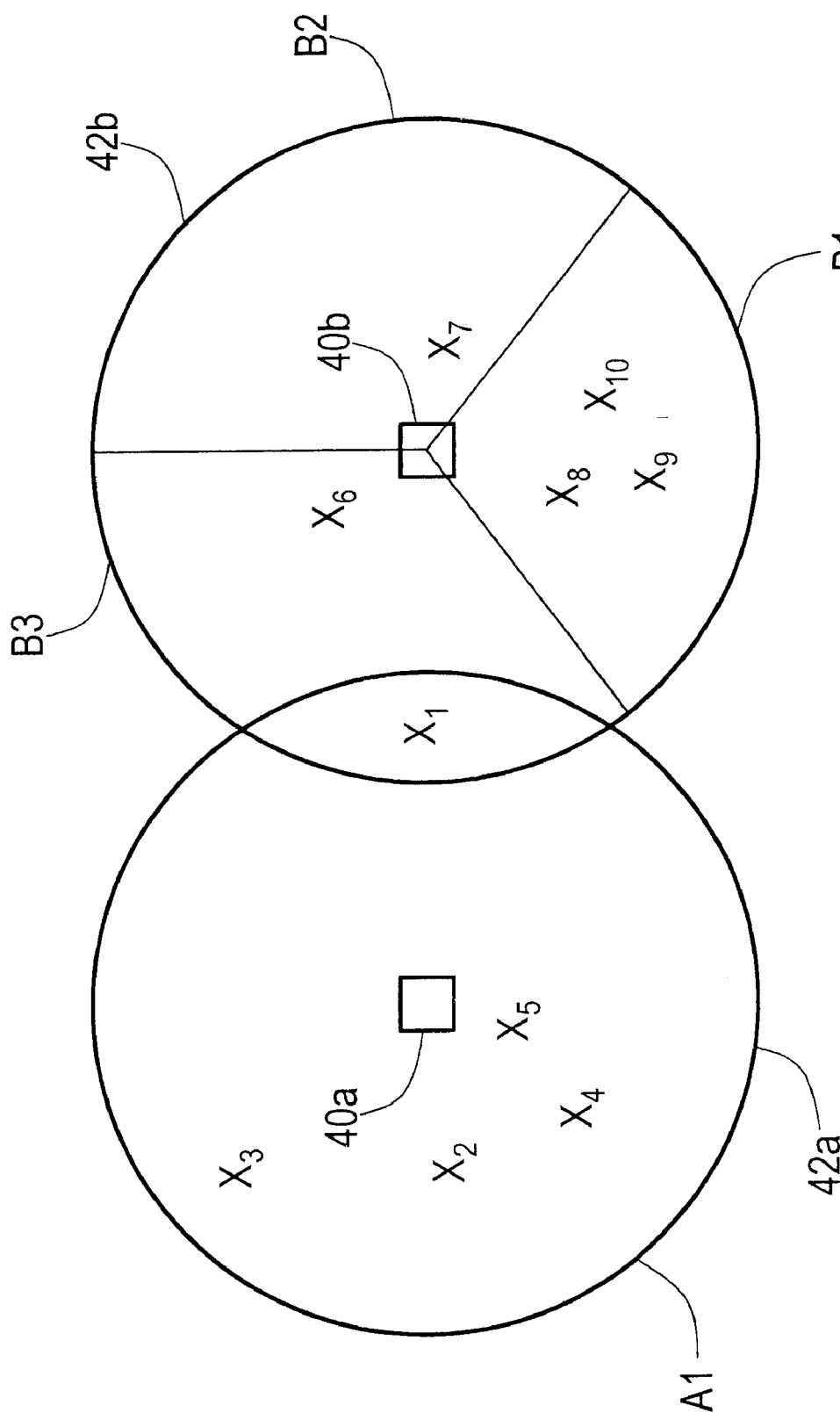
FIG. 5 shows an alternate embodiment depicting a multi-sector base station processor.

In another embodiment shown in FIG. 5, a single base station processor serves multiple sectors. Here, each of the sectors has a corresponding receiver at the base station processor. The receivers carry the physical wireless radio signal between the base station processor and the subscriber access units. Each sector is still defined by the geographic wireless coverage area representing the physical transmission capacity of the corresponding receiver. In this embodiment, called a multi-sector embodiment, a session context transfer works similarly to change a subscriber access unit from one receiver to another. The same base station processor, however, is servicing both sectors. In the example shown, subscriber access unit X1 is in the wireless coverage area corresponding to base station processors 40*a* and 40*b*. Subscriber access unit X1, therefore, can establish a session context transfer between base station processors 40*a* and 40*b*. Base station processor 40*b*, however, has three receivers within the wireless coverage area 42*b*. The wireless coverage area 42*b* served by the base station processor 40*b*, therefore, includes three overlapping sectors within the wireless coverage area 42*b*. A session context transfer, therefore, can be established between the sectors corresponding to receivers B1, B2, and B3, without a subscriber access unit being served by a different base station processor. For example, subscriber access unit X6, currently in the sector corresponding to receiver B3, can establish a session context transfer to the sector corresponding to receiver B2 or B1.

The loading factor determination will now be discussed in more detail. In a base station processor, there are typically many subscriber access units being served by the base station processor. The base station processor allocates available resources on a demand basis to the subscriber access units. Requests for resources are typically queued pending availability. If there are a large number of subscriber access units, the number of queued requests increases, as does the time lag for a queued request to be served. Accordingly, subscriber access units wait longer for available resources, diminishing throughput at the subscriber access unit.

To determine the loading factor, the load manager receives one or more load parameters which are indicative of the resource utilization of the base station processor. The load parameters may be weighted, based on the extent to which a particular parameter is an accurate predictor of resource utilization. The load parameters which may be used in determining the loading factor include a link quality measure, current subscriber quantity, average channel allocation time, average channel held time, and bytes per second. Other load parameters may be used. Further, the link quality measure is indicative of the radio signal between the subscriber access unit and the base station processor, and includes transmission parameters such as signal to noise ratio, received RF power, coding rate, and bit error rate.

The loading parameters may be accumulated at the base station processor and sent to the subscriber access unit as a loading summary. The subscriber access unit determines the loading factor from the parameters in the loading summary. Alternatively, the loading factor may be determined at the base station processor and a loading summary including a scalar quantity indicative of the loading factor sent to the subscriber access unit. A subscriber access unit receiving loading summaries from a plurality of base station processors may then compute the load divergence, described further below, to determine which base station processor is least burdened. If the loading summary is not indicative of a minimum loading factor threshold, it may not be efficient to compute a weighted loading factor or a load divergence since there is not likely to be a significant benefit from establishing a session context transfer.

A load divergence is computed at the subscriber access unit to determine, from the loading factors of the candidate base station processors, which base station processor is least burdened. The load manager computed the load divergence using a loading factor history. The loading factor history applies an aging metric to previous loading factors at the candidate base station processors. Older loading factor values are less applicable than more recent loading factor values. In this manner, a base station processor experiencing a consistent decline in utilization will not apply obsolete loading factors indicative of a burdened state. Conversely, a sudden burst or gap in traffic will not trigger a premature session context transfer because the history values will indicate a more stable indication of the true utilization.

Figure 6:
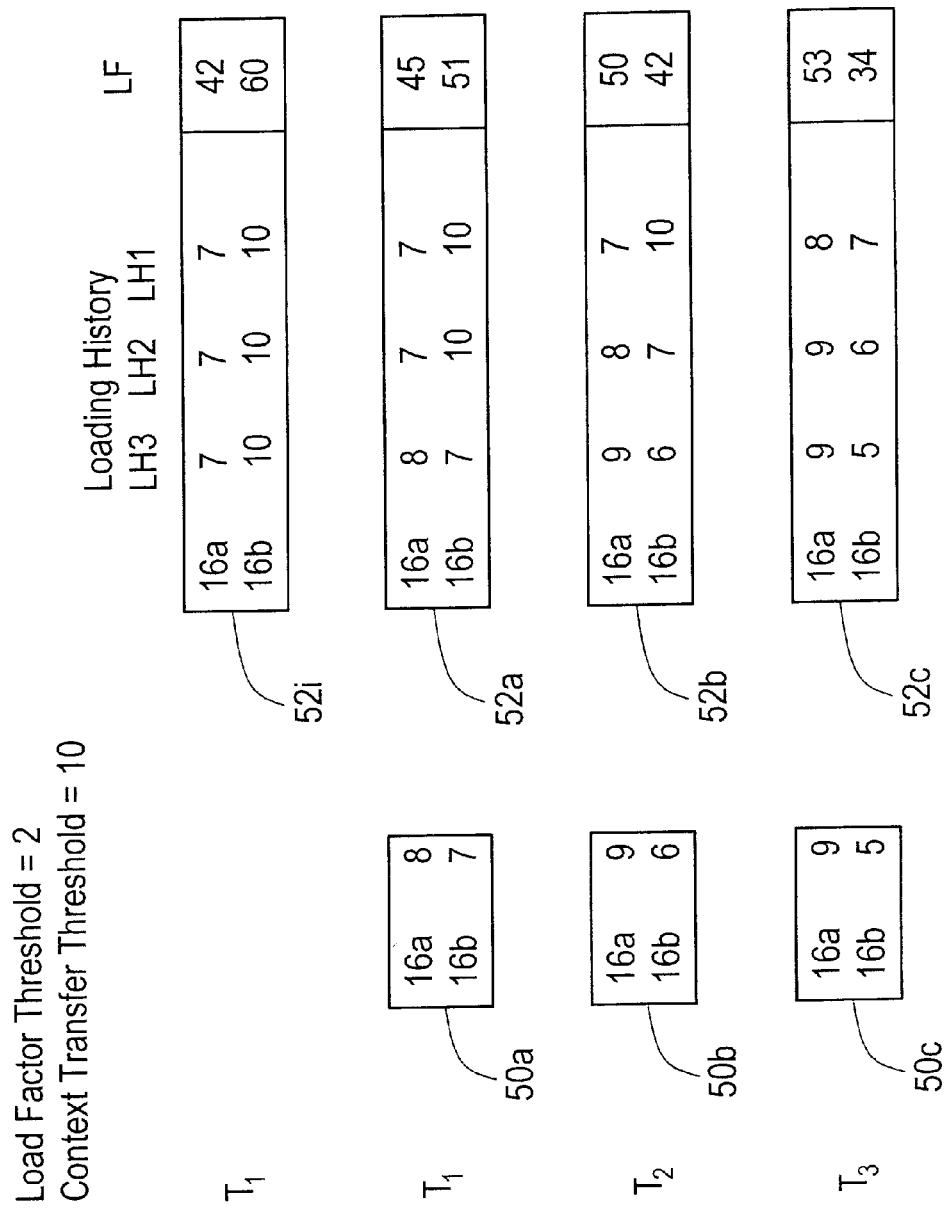
FIG. 6 shows an example of a session context transfer as defined herein.

An example of the values used in determining the loading factor and computing the load divergence to establish a context transfer is shown in FIG. 6. Referring to FIGS. 6 and 2 an initial loading history 52$i$ and three sequential loading summaries from times $T_1$, $T_2$, and $T_3$ are shown. The loading history retains the three most recent loading factors, shown in columns LH3–LH1, wherein LH3 is the most recent. The loading factor threshold is 2 and the context transfer threshold is 10. The load history weighting determines the weighted loading factor, shown in column LF, by computing (3* most recent loading factor LH3)+(2* previous loading factor LH2)+(1* oldest loading factor LH1). The loading history for the initial time $T_1$ is shown for base station processors 16$a$ and 16$b$, respectively. At time $T_1$, subscriber 14$a$ is being served by 16$a$, and the weighted loading factors, computed as indicated above, are as shown in column LF.

A load divergence trigger occurs, and the loading summaries 50$a$ for time $T_1$ are received, including the snapshot loading factors for base station processors 16$a$ and 16$b$. A loading factor difference is computed: 8−7=1, and compared to the loading factor threshold. Since the immediate load divergence is not greater than the loading factor threshold, no weighted loading summary is determined. The loading factors for $T_1$ are stored in the loading history 52$a$, and the loading history values shift to keep the loading history updated with the three most recent loading factors.

At time $T_2$, the loading summaries 50$b$ are returned, and compared to the loading factor threshold: 9−6=3. Since the loading factor threshold is exceeded, a weighted loading factor is determined. The weighted loading factor at time $T_2$ is shown in column LF, and is used to determine the load divergence: 51−45=6. Since the load divergence does not exceed the context transfer threshold, no session context transfer is established. Note that although the loading factor for the base station processor 16$b$ has dropped, the loading history 52$b$ still includes a value of 10, thereby maintaining a relatively high weighted loading factor. The values corresponding to $T_2$ are stored in the loading history.

At time $T_3$, the loading summaries 50$c$ are received, and the snapshot loading factor determined: 9−5=4. Since the loading factor threshold is again exceeded, a weighted loading summary will be determined. Using the loading history 52$c$ values for $T_3$ indicates a weighted loading factor of 53 for base station processor 16$a$, but only 34 for base station processor 16$b$. The load divergence is computed: 53−34=19, and since the context transfer threshold is exceeded, subscriber access unit 14$a$ will perform a session context transfer to base station processor 16$b$.

The load parameters and values described herein are indicated as illustrative only. Other load parameters and weighing methods can be used to determine if a context session switch. The subscriber access units determine if a context session switch will occur to even the overall throughput of the wireless communication network. In this manner, already burdened base station processors will tend to not be further burdened with additional subscriber access units to serve. Similarly, lightly loaded base station processors will tend to be requested to serve additional subscriber access units.

Those skilled in the art should readily appreciate that the programs defining the operations and methods defined herein are deliverable to a subscriber access unit and to a base station processor in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components, or hardware, software or firmware simulators.

While the system and method for wireless session context transferring have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of transferring session context by a subscriber unit in a wireless communication network comprising:

defining, at the subscriber unit, a first wireless coverage area provided by a first base station;

establishing a first wireless session context between the subscriber access unit and the first base station;

defining, at the subscriber unit, a second wireless coverage area provided by a second base station;

determining a first loading factor indicative of a throughput load at the first base station;

determining a second loading factor indicative of a throughput load at the second base station; and selectively establishing a second wireless session context between the subscriber access unit and the second base station;

wherein determining the first loading factor and determining the second loading factor further comprises:
transmitting a first loading summary from the first base station;
transmitting a second loading summary from the second base station; and
receiving the first loading summary and the second loading summary at the subscriber access unit.

2. The method of claim 1 wherein comparing further comprises computing a load divergence indicative of the difference between the first loading factor and the second loading factor.

3. The method of claim 2 wherein selectively establishing further comprises comparing the load divergence to a predetermined context transfer threshold and selectively establishing based on the comparing.

4. The method of claim 2 wherein the load divergence is indicative of a lesser throughput load at the second base station.

5. The method of claim 1 wherein the loading factor history is a sliding window of previous first loading factor and second loading factor values.

6. The method of claim 1 wherein determining the first loading factor and determining the second loading factor further comprises reading at least one load parameter and computing the first loading factor and the second loading factor using the at least one load parameter.

7. The method of claim 6 wherein reading the load parameters further comprises reading at least on parameter selected from the group consisting of a link quality measure, current subscriber quantity, average channel allocation time, average channel held time, and bytes per second.

8. The method of claim 7 wherein the link quality measure further comprises signal quality factors selected from the group consisting of a signal to noise ratio, received RF power, coding rate and bit error rate.

9. The method of claim 8 wherein determining the first and second loading factors further comprises:
 reading each of the load parameters; and
 computing a loading factor based on a weighted comparison of the load parameters.

10. A method of transferring session context in a wireless communication network comprising:
 defining a first wireless coverage area provided by a first base station;
 establishing a first wireless session context between a subscriber access unit and the first base station;
 defining a second wireless coverage area provided by a second base station;
 determining whether the subscriber access unit is concurrently in the first wireless coverage area and the second wireless coverage area;
 determining a first loading factor indicative of a throughput load at the first base station;
 determining a second loading factor indicative of a throughput load at the second base station;
 storing the first loading factor and the second loading factor in a loading factor history, wherein the first loading factor and the second loading factor further comprise a snapshot loading factor and a weighted loading factor wherein the snapshot loading factor is indicative of the previous determination of the loading factor and the weighted loading factor includes the loading factor history indicative of a plurality of previous loading factor values; and
 selectively establishing a second wireless session context between the subscriber access unit and the second base station.

11. The method of claim 10 wherein computing the load divergence further comprises comparing the snapshot loading factor to a loading factor threshold and selectively computing the load divergence based on the comparing.

12. A system for establishing a wireless communication link comprising:
 a first base station connected to a public access network and operable for wireless communication in a wireless network;
 a second base station connected to the public access network and operable for wireless communication in a wireless network;
 a subscriber access unit operable for wireless communication with the first base station processor and the second base station processor; and
 a load manager at the subscriber access unit operable to determine a loading factor indicative of a throughput load, wherein a wireless session context is selectively established from the subscriber access unit to the first base station processor and the second base station processor based on the loading factor, further comprising a context selector in communication with the load manager, wherein the context selector establishes the wireless session context when the loading factor is indicative of an imbalanced throughput load between the first base station processor and the second base station processor.

13. The system of claim 12 wherein the load manager is further operable to determine a first loading factor indicative of the throughput load at the first base station processor, and a second loading factor at the second base station processor, wherein an imbalanced throughput load is indicative of a predetermined difference between the first loading factor and the second loading factor.

14. The system of claim 13 wherein the load manager is operable to receive load parameters and further operative to compute the first loading factor and the second loading factor based on the load parameters.

15. The system of claim 14 wherein the load parameters further comprise parameters selected from the group consisting of: a link quality measure, current subscriber quantity, average channel allocation time, average channel held time, and bytes per second.

16. The system of claim 15 wherein the link quality measure further comprises factors selected from the group consisting of: a signal to noise ratio, received RF power, coding rate, and bit error rate.

17. A system for establishing a wireless communication link comprising:
 a first base station connected to a public access network and operable for wireless communication in a wireless network;
 a second base station connected to the public access network and operable for wireless communication in a wireless network;
 a subscriber access unit operable for wireless communication with the first base station processor and the second base station processor; and
 a load manager operable to determine a loading factor indicate of a throughput load, wherein a wireless session context is selectively established from the subscriber access unit to the first base station processor and the second base station processor based on the loading factor, wherein the load manager is further operable to determine a snapshot loading factor and a weighted loading factor, wherein the snapshot loading factor is indicative of the previous loading factor and the weighted loading factor is determined using the loading history.

18. The system of claim 17 wherein the load manager selectively determines a load divergence based on a comparison of the snapshot loading factor and a loading factor threshold.

19. The system of claim 18 wherein the context selector initiates a session context transfer when the load divergence exceeds a context transfer threshold.

* * * * *